March 24, 1953 W. M. GARING 2,632,249
STYLUS HOLDER
Filed July 19, 1951

INVENTOR.
Wilbur M. Garing
BY Victor J. Evans & Co.
ATTORNEYS

Patented Mar. 24, 1953

2,632,249

UNITED STATES PATENT OFFICE 2,632,249

STYLUS HOLDER

Wilbur M. Garing, Torrington, Wyo.

Application July 19, 1951, Serial No. 237,647

1 Claim. (Cl. 33—18)

This invention relates to engraving machines particularly of the type used for engraving inside of rings, other cylindrical objects and utensils where a straight stem is not adapted, and in particular a U or V-shaped arm having attaching means on one end for mounting the arm on the spindle housing of an engraving machine and a stylus retaining socket in the end of the other.

The purpose of this invention is to provide a holder for the stylus of engraving machines for engraving inside of objects and devices in which bulkiness is eliminated and wherein the operator has unobstructed vision of the cutting point or stylus in the engraving operation.

The stylus holder of this invention is an improvement over the holder of my co-pending application with the Serial Number 193,497 for an inside ring engraving attachment in that the clamp at the upper end of the holder is replaced by a knurled nut and the square formation of the arm is replaced by a streamlined arcuate arm.

In the holder of the co-pending application and also in conventional holders of this type attempts have been made to clamp the holder around the exterior of the spindle housing and clamps of this type substantially fill the open area around the stylus and housing so that direct lines of vision to the cutting stylus are obstructed and substantially eliminated.

With this thought in mind this invention contemplates a streamlined U or V-shaped arm positioned in a vertical plane with an upper section having a flange by which the arm is clamped to the spindle housing of an engraving machine with a knurled nut and in which the lower section is provided with a stylus holding socket.

The object of this invention is, therefore, to provide means for forming a holder for the stylus of an engraving machine whereby the operator has substantially unobstructed vision of the cutter.

Another object of the invention is to provide an improved stylus holder for engraving machines that may be attached to a machine without changing the design or construction thereof.

A further object of the invention is to provide an improved streamlined stylus holder for engraving machines which is of a simple and economical construction.

With these and other objects and advantages in view the invention embodies a substantially U or V-shaped arm, circular in cross section having an opening through one end for receiving the stylus carried by the spindle housing of the machine and having a flange around the outer end of the opening and adapted to be clamped by a nut in the recess in the end of the spindle housing, and having a stylus carrying socket in the opposite end.

Other features and advantages of the invention will appear from the following description taken in connection with the drawings wherein.

Figure 1:
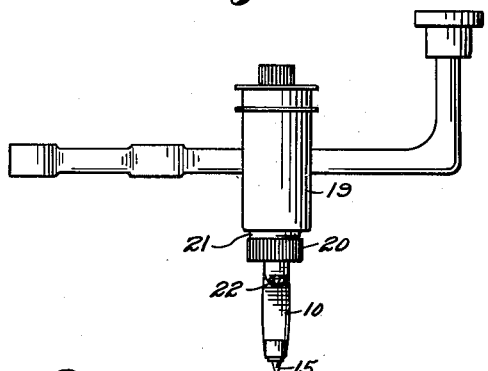
Figure 1 is a side elevational view illustrating the stylus holder in position on the spindle housing of an engraving machine.

Referring now to the drawings wherein like reference characters denote corresponding parts the improved stylus holder of this invention includes an arcuate U or V-shaped arm 10 having a flange 11 around the outer end of an opening 12 extended through one end of the holder and having a socket 13 in the opposite end for holding a shank 14 of a stylus or cutting tool 15.

Figure 2:
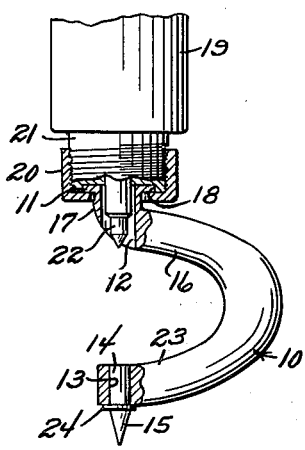
Figure 2 is an elevational view with parts broken away taken from a point at a right angle to that shown in Figure 1, in which the parts are shown on an enlarged scale and in which parts are broken away and shown in section.
Figure 3:
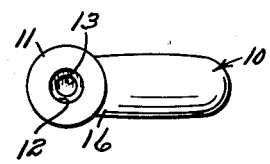
Figure 3 is a plan view of the stylus holder with the holder in the position shown in Figure 2 and with the nut and spindle housing removed.
Figure 4:
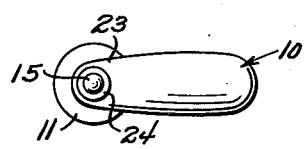
Figure 4 is a view looking upwardly toward the opposite end of the stylus holder.

As illustrated in the drawing the intermediate part of the holder, which is circular in cross section, is slightly enlarged with the ends tapering off and with the holder positioned as illustrated in Figure 2, the upper end 16 is provided with a cylindrical section 17 through which the opening 12 extends and on the upper end of which the flange 11 is positioned.

With the holder in the operating position the flange 11 is retained in a recess 18 in the lower end of the spindle housing 19 by a nut 20 that is threaded on the lower end 21 of the housing.

With the parts arranged in this manner the opening 12 of the stylus holder is placed over a conventional stylus 22 and by loosening and tightening the nut 20 the position of the arm or holder 10 is adjusted to the convenience of the operator.

The socket 13 is aligned with the opening 12 whereby the stylus 15 is centered with the stylus 22 of the machine.

The stylus 15, the shank 14 of which is positioned in the socket 13 of the lower end 23 of the holder is provided with a flange 24 that is positioned against the under surface of the lower end of the stylus holder.

It will be understood that modifications may be made in the design and arrangement of the parts without departing from the spirit of the invention.

What is claimed is:

In a stylus holder, the combination of which comprises a substantially U-shaped arm, said arm being circular in cross section, having tapering ends with aligned openings extended through the ends and having an annular flange extended from the outer surface of one end, the opening through the end of the arm on which the tubular section and flange are positioned being extended through the tubular section and flange and said tubular section and flange being concentric with the axis of the openings extended through the ends of the arms, a cutting tool mounted in the end of the arm opposite to that on which the flange is positioned, a spindle housing having a recess in the end positioned with the flange of the holder in the said recess, and a nut threaded on the spindle housing and having an inwardly extended flange positioned over the flange of the holder.

WILBUR M. GARING.

REFERENCES CITED

The following references are of record in the file of this patent:

UNITED STATES PATENTS

| Number | Name | Date |
|---|---|---|
| 190,797 | Ware | May 15, 1877 |
| 435,243 | Ourdan et al. | Aug. 26, 1890 |